United States Patent [19]

McCarty et al.

[11] Patent Number: 5,091,315

[45] Date of Patent: Feb. 25, 1992

[54] BIOCONVERSION REACTOR

[75] Inventors: Perry L. McCarty, Stanford; Andre Bachmann, Palo Alto, both of Calif.

[73] Assignee: The Board of Trustees of Stanford University, Stanford, Calif.

[21] Appl. No.: 366,250

[22] Filed: Jun. 13, 1989

Related U.S. Application Data

[63] Continuation of Ser. No. 771,972, Sep. 3, 1985, abandoned, which is a continuation-in-part of Ser. No. 414,958, Sep. 3, 1982, abandoned.

[51] Int. Cl.$^5$ ............................................. C12M 1/00
[52] U.S. Cl. .................................. 435/287; 435/801; 261/123; 210/320
[58] Field of Search ................ 435/287, 310, 313–316, 435/801, 288; 210/218, 220, 320; 422/193, 195; 261/123, 125

[56] References Cited

U.S. PATENT DOCUMENTS

| | | | |
|---|---|---|---|
| 2,083,348 | 6/1937 | Sholler et al. | 435/310 X |
| 2,202,772 | 5/1940 | Dordin | 210/2 |
| 2,760,850 | 8/1956 | Lambert et al. | 422/194 |
| 2,852,581 | 9/1958 | Stiles | 422/194 X |
| 3,010,806 | 11/1961 | Berry | 422/193 |
| 3,054,602 | 9/1962 | Proudman | 210/220 |
| 3,476,366 | 11/1969 | Brooks et al. | 435/314 X |
| 3,580,840 | 5/1971 | Uridil | 435/310 X |
| 3,898,049 | 8/1975 | Burroughs et al. | 422/195 X |
| 3,959,923 | 6/1976 | Selke | 435/287 X |
| 4,201,792 | 5/1980 | Fricker et al. | 426/15 |
| 4,267,038 | 5/1981 | Thompson | 47/1.4 X |
| 4,302,329 | 11/1981 | Pfefferkorn | 210/97 |
| 4,306,968 | 12/1981 | Yost | 210/218 X |
| 4,397,953 | 8/1983 | Guazzone et al. | 435/801 X |
| 4,545,909 | 10/1985 | Atkinson et al. | 435/285 X |

FOREIGN PATENT DOCUMENTS

| | | | |
|---|---|---|---|
| 0521796 | 9/1955 | Belgium | 261/123 |
| 0145792 | 6/1985 | European Pat. Off. | |
| 256235 | 9/1959 | Netherlands | |
| 253466 | 11/1948 | Switzerland | |
| 0185851 | 9/1966 | U.S.S.R. | 422/193 |
| 2075547 | 11/1981 | United Kingdom | 435/313 |

OTHER PUBLICATIONS

Tait et al., "Anaerobic Rotating Biological Contactor for Carbonaceous Wastewaters" Journal Water Pollution Control Federation, vol. 52, 1980, pp. 2257–2269.
Levenspiel, Chemical Reaction Engineering, Wiley & Sons, N.Y., 1972, pp. 253–254, 306–307.
Lettinga et al., "Anaerobic Treatment of Methanolic Wastes", Water Research, vol. 13, pp. 725–737, 1979.
Young & McCarty, "The Anaerobic Filter for Waste Treatment", Journal Water Pollution Control Federation, vol. 41, R 160–173, May 1969.
Switzenbaum & Jewell, "Anaerobic Attached-Film Expanded-Bed Reactor Treatment", Journal Water Pollution Control Federation, vol. 52, pp. 1953–1965, Jul. 1980.
Tompkins, "Marine Biomass Program", Annual Report for 1979, GRI-79/0079, Sep. 1980.
Chynoweth et al., "Research Study to Determine the Feasibility of Producing Methane Gas from Sea Kelp", Project 30502 Annual Report for period 1/1 through 12/31/79, Apr. 1980.
Fannin et al., "Marine Biomass Program: Anaerobic Digester System Development", Project 30502 Annual Report for the period 1/1 through 8/31/80, Feb. 1981.

Primary Examiner—David L. Lacey
Assistant Examiner—William Chan
Attorney, Agent, or Firm—Heller, Ehrman, White & McAuliffe

[57] ABSTRACT

A bioconversion reactor for the anaerobic fermentation of organic material. The bioconversion reactor comprises a shell enclosing a predetermined volume, an inlet port through which a liquid stream containing organic materials enters the shell, and an outlet port through which the stream exits the shell. A series of vertical and spaced-apart baffles are positioned within the shell to force the stream to flow under and over them as it passes from the inlet to the outlet port. The baffles present a barrier to the microorganisms within the shell causing them to rise and fall within the reactor but to move horizontally at a very slow rate. Treatment detention times of one day or less are possible.

50 Claims, 3 Drawing Sheets

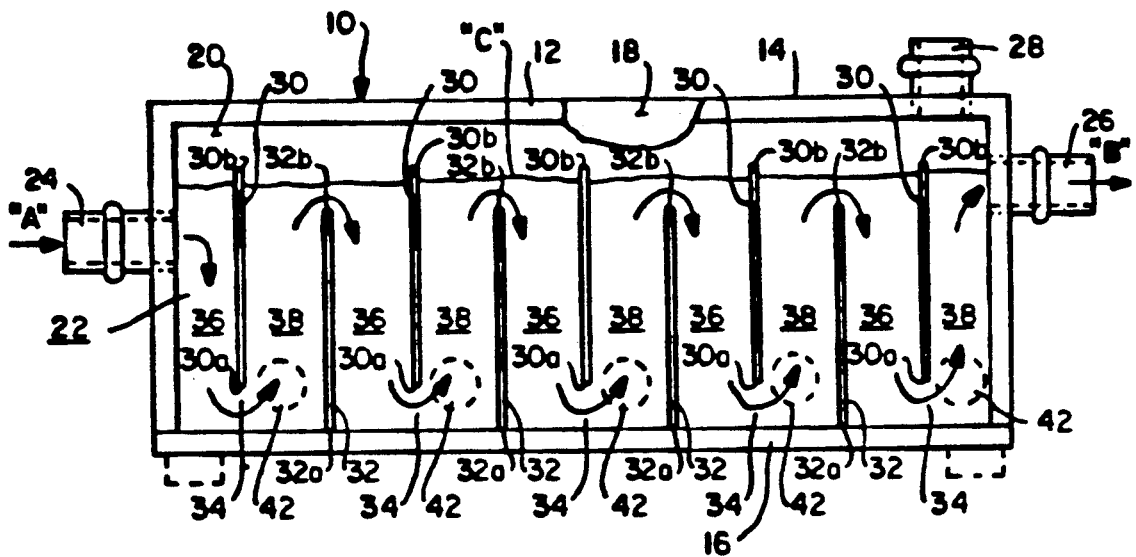
FIG.—1
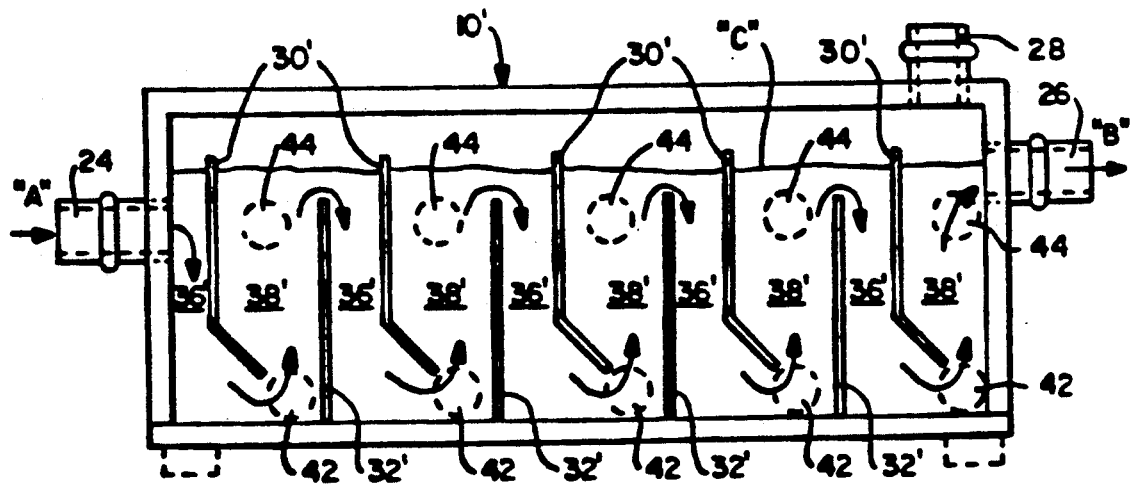
FIG.—2

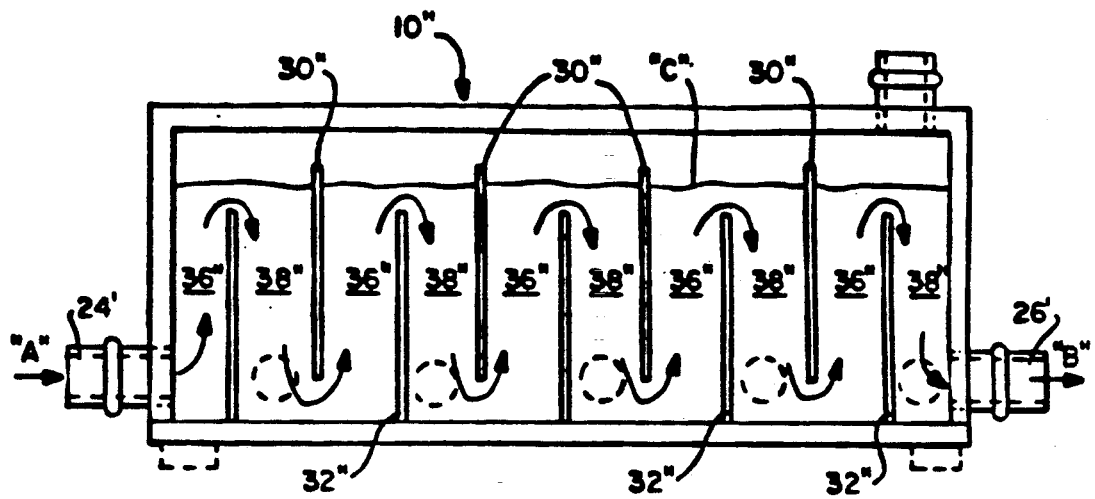
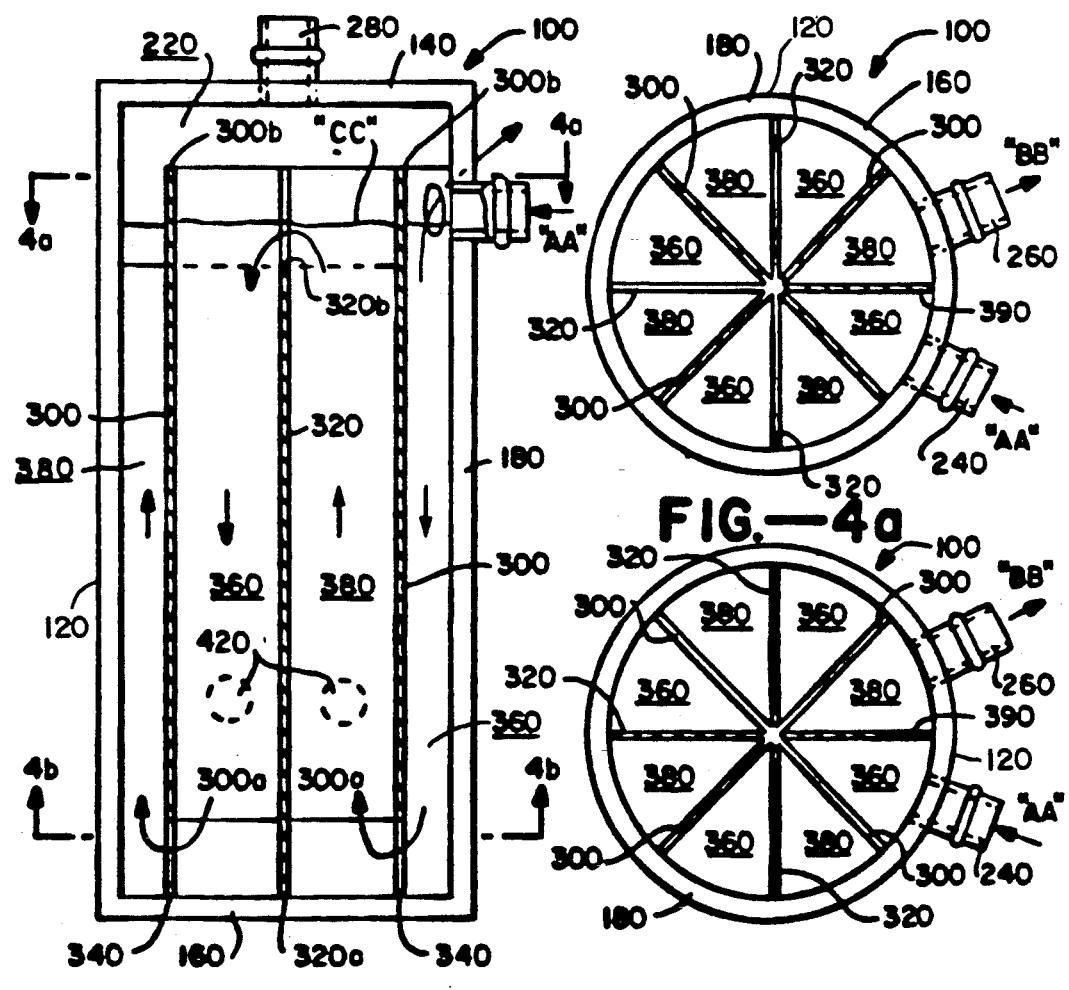

BIOCONVERSION REACTOR

This invention was made with Government support under Contract No. EG-77-C-01-4042 awarded by the Department of Energy to the solar Energy Research Institute (SERI). The invention was developed at Stanford University under Subcontract No. XR-9-8174-1 awarded to the Board of Trustees at Leland Stanford, Jr. University by SERI. The Government has certain rights in this invention.

This is a continuation of application Ser. No. 771,972 filed Sept. 3, 1985, now abandoned, which is a continuation-in-part of application Ser. No. 414,958 filed Sept. 3, 1985, now abandoned.

The invention relates to the anaerobic fermentation of organic materials, and more particularly to a bioconversion reactor for use in the anaerobic fermentation of organic materials.

The microbiological conversion of organic materials to methane gas is thought to have great potential for satisfying a significant proportion of the current demand for natural gas in the United States. The technology associated with this process has progressed to the point where it can be commercialized and can produce cost-competitive energy in some instances. Fermentation to methane has an advantage in that it produces a high-quality, clean-product gas which can be readily transported by existing gas-distribution networks. Additionally, organic materials which are too wet for direct combustion can be fermented to methane. Another advantage is that the nutrient value of the biomass is not destroyed by methane fermentation and can be recycled back to the land.

Anaerobic fermentation is also becoming much more attractive for the treatment of many organic-containing industrial wastewaters as it produces rather than consumes energy, the problem with the more commonly used aerobic processes for treating wastewaters. Interest in the anaerobic fermentation of industrial wastewaters has been strong; however, the availability of a reliable process that operates efficiently at short detention times has been lacking.

A typical anaerobic fermentation process involves flowing a liquid stream, which contains the organic materials to be treated, into a reactor which has been seeded with a biomass or microorganisms. The process may or may not involve pretreatment of the organic materials before anaerobic fermentation of the resulting soluble and particulate materials in the reactor. For the more dilute organic-material streams (less than 2% organics), the fermentation reactor must be a solid contact type in which the residence time of the microorganisms in the reactor is much greater than that of the liquid stream or effluent in the system. Among the problems with present reactor designs is that it is difficult to maintain a long residence time for the microorganisms in the reactor, either because they cannot be held within the reactor, or if they are, the resulting high concentrations tend to clog the reactor.

Several systems have been developed in the past. The simplest and least expensive system comprises an upflow unit with no media or mixing in the reactor, but with a separation funnel at the top to permit separation of gas from the liquid and biological solids within the reactor.

This design is described in an article by Lettinga et al., "Anaerobic Treatment of Methanolic Wastes", *Water Research*, Vol. 13, pp. 725-737, 1979. This system depends on the ability of bacterial solids to floculate and remain for the most part in the lower zone of the reactor. Mixing of entering waste and bacterial solids is encouraged primarily by the turbulence created by the rising gas bubbles. This process is termed the upflow anaerobic sludge blanket process. The system is relatively inexpensive; however, its reliability is variable due to the difficulty in controlling the bacterial solids. Although the reactor has operated at less than a one-day detention time, gas-induced rising of bacterial solids and clogging of exit ports have been problems.

A second system is the anaerobic filter, which is described in an article by Young and McCarty, "The Anaerobic Filter For Waste Treatment", *Journal Water Pollution Control Federation*, Vol. 41, R160-173, May 1969. This may be an upflow or downflow system in which a fixed media such as rock is used to keep the bacteria within the system. The system can operate at a one-day or less detention time and is very reliable. However, the media, the rocks, occupy a lot of space, making the reactor very large. Other media such as plastics could be used to reduce this problem, but are generally expensive. The reactor also can eventually become clogged, although some solutions to this problem have been claimed.

Another system is the fluidized bed reactor described in an article by Switzenbaum and Jewell, "Anaerobic Attached-Film Expanded-Bed Reactor Treatment", *Journal Water Pollution Control Federation*, Vol. 52, pp. 1953-1965, July, 1980. This reactor is an upflow system which contains fine aluminum oxide particles or other media upon which the microorganisms attach and grow. Recycle is employed to obtain sufficient flow to fluidize or expand the media.

With this system contact between the organic-material stream and bacteria is optimized and detention times can be significantly reduced. However, this system is more difficult to operate reliably than other systems, especially on smaller scales. There is also some question about energy requirements for the high recycle rate required for media expansion.

Yet another system is the rotating biological contactor. Here, the organic materials or waste moves in a horizontal fashion around a series of slowly rotating plastic disks. The microorganisms are attached to the surfaces of the plastic disks. This system has a void volume of about 70%. This system seems to represent a good compromise between the fluidized bed reactor and the filter systems. However, the equipment is expensive and fairly complicated because of the rotating disk. This system is described in an article by Tait and Friedman, "Anaerobic Rotating Biological Contactor For Carbonaceous Waste Waters", *Journal Water Pollution Control Federation*, Vol. 52, pp. 2257-2269, 1980.

The present invention is a continuous bioconversion reactor which encompasses some of the advantages of the above reactors without their disadvantages. The system uses a series of baffles wherein the liquid stream containing the organic materials flows under and over the baffles as it passes from the inlet port to the outlet port of the reactor. The bacteria or microorganisms tend to rise and fall within the reactor but move horizontally at a slow rate. The reactor is simple in design, reliable, and serves to maintain the microorganisms within the reactor so that treatment detention times of one day or less are possible.

An object of the present invention is to provide an improved bioconversion reactor for the anaerobic fermentation of organic materials.

A more specific object of the present invention is to provide an improved bioconversion reactor which is simple in design, reliable, and which maintains the microorganisms within the reactor so that treatment detention times of the organic materials of one-day or less are possible.

According to the present invention, a bioconversion reactor for the anaerobic fermentation of organic material is provided. The bioconversion reactor comprises a shell having top, side, and bottom walls enclosing a predetermined volume. The shell further includes inlet and outlet ports through which a liquid stream containing the organic material flows. A plurality of baffles are positioned within the shell and spaced from one another with the sides thereof joined to the shell's side walls. Alternate ones of the baffles are joined at the lower edges to the bottom wall of the shell. Other baffles have their lower edges spaced from the bottom wall to define flow passageways therebetween. The liquid stream flows through the flow passageways around the lower edge of the other baffles and up and across the upper edge of the alternate baffles. The baffles present a barrier to microorganisms within the shell, impeding their flow so that they remain in the reactor as the effluent flows therethrough. A gas port may also be provided through which gases in the reactor may escape.

The bioconversion reactor of the present invention will be described in more detail hereinafter in conjunction with the drawings wherein:

FIG. 1 is a schematic diagram illustrating the bioconversion reactor of the present invention;

FIG. 2 is a schematic diagram which illustrates an alternate embodiment of the bioconversion of the present invention;

FIG. 3 is a schematic diagram illustrating another embodiment of the bioconversion reactor of the present invention;

Figure 5:
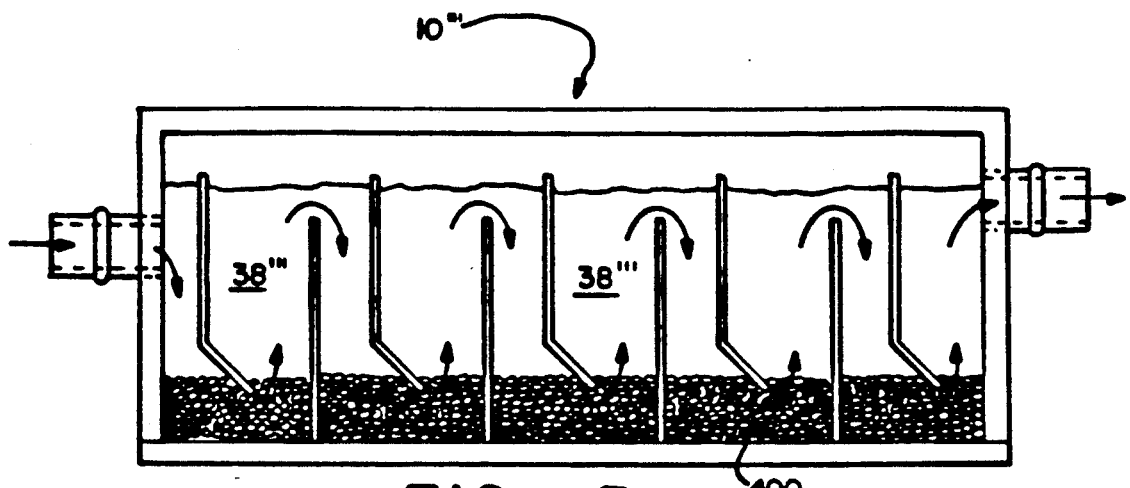
Figure 6:
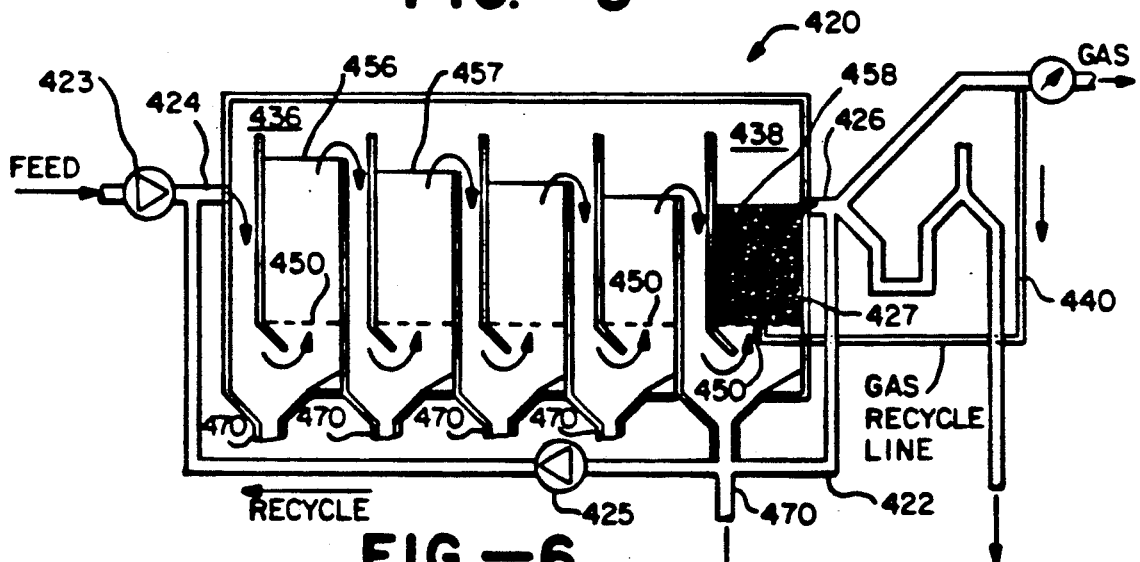
Figure 7:
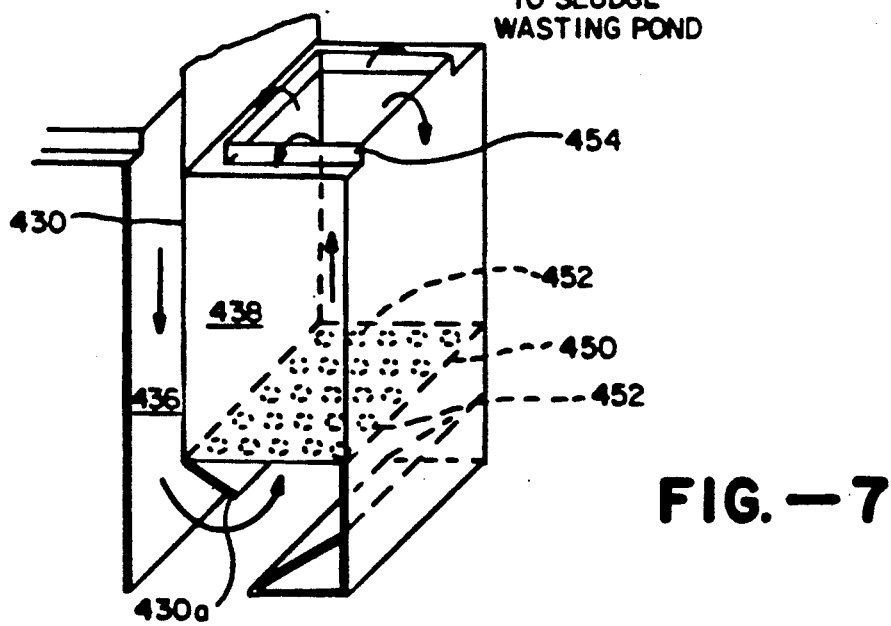

FIGS. 4, 4A and 4B schematically illustrate an embodiment of the bioconversion reactor of the present invention wherein the reactor is cylindrical in shape;

FIG. 5 is a schematic diagram which illustrates still another embodiment of the bioconversion reactor of the present invention; and FIGS. 6 and 7 are schematic diagrams which illustrate a further embodiment of the present invention.

The bioconversion reactor of the present invention has been developed to anaerobically ferment organic materials. For instance, the reactor may be used to anaerobically ferment organic-containing streams from processing agricultural residues such as corn stover, wheat straw and rice straw for the production of methane gas. The reactor may also be used in the anaerobic treatment of industrial wastewaters. A typical anaerobic treatment process may or may not involve pretreatment of the organic materials before anaerobic fermentation of the resulting soluble and particulate matter. To treat relatively dilute organic wastes (less than 2% organic material), the residence time of the microorganisms in the reactor must be much greater than that of the liquid stream in which the organic materials are contained. The bioconversion reactor of the present invention is suitable for use in the anaerobic treatment of very dilute to medium strength organic streams.

Referring to the drawings, wherein like components are designated by like reference numerals in the various figures, attention is first directed to FIG. 1 which shows the bioconversion reactor 10 of the present invention. Bioconversion reactor 10 comprises a shell 12 which is rectangular in shape and which has top, bottom and side walls 14, 16, 18, and 20, respectively, defining a predetermined volume 22. Reactor 10 has an inlet port 24 and an outlet port 26. The liquid stream in which the organic materials are contained enters the interior of shell 12 or predetermined volume 22 through inlet port 24. The effluent exits the reactor through outlet port 26. The direction of the flow of the stream through the reactor is indicated by arrows "A" and "B". Recycle of the effluent stream to mix with and dilute the influent stream may or may not be used. A gas port 28 in shell 12 may also be provided. Methane and other gases produced by the anaerobic fermentation of the organic materials within shell 12 can escape therefrom through gas port 28.

A plurality of baffles 30 and 32 are positioned within predetermined volume 22, along the length of shell 12. Baffles 30 and 32 are rectangular in shape and are affixed on each side thereof to side walls 18 and 20 of shell 12. The baffles therefore extend across the cross-sectional dimension of the shell. Baffles 32 are affixed at the lower edges thereof 32a to bottom wall 16 of the shell to be substantially perpendicular therewith. The lower edges 30a of baffles 30 are spaced from bottom wall 16 to define flow passageways 34 therebetween. Baffles 30 and 32 are substantially parallel to one another. Should shell 12 be other than rectangular in shape, for example square or cylindrical, baffles 30 and 32 will be configured accordingly.

Baffles 30 and 32 divide the interior of shell 12 into a plurality of downflow and upflow chambers 36 and 38, respectively. The cross-sectional dimensions of the downflow and upflow chambers are substantially equal. The downflow chambers 36 are in fluid communication with fluid passageways 34 on that side of the passageways nearest inlet port 24. The upflow chambers 38 are in fluid communication with that side of flow passageways 34 nearest outlet port 26. The level of the liquid stream within shell 12 is represented by line "C". The upper edges 30b of baffles 30 extend beyond this level. The construction of bioconversion reactor 10 permits a high volume of liquid in chambers 36 and 38 relative to predetermined volume 22, thus giving efficiency of reactor volume usage. The large open spaces comprising chambers 36 and 38 and the fluid passageways 34 between the chambers essentially eliminate clogging of the reactor by the microorganisms or biomass.

The bioconversion reactor 10 may also include a plurality of sample ports 42 spaced at intervals along the longitudinal dimension of the reactor. The sampling ports facilitate sampling of the liquid stream in the reactor and permit wasting of solids should the reactor clog.

As is well-known in the art, reactor 10 is seeded with microorganisms which react with the organic material in the liquid stream flowing through the reactor to anaerobically ferment those materials. The flow through the reactor is along the flow path established by vertical baffles 30 and 32. The baffles force the liquid stream to flow under and over them as it passes from the inlet to the outlet port. More particularly, the liquid stream entering reactor 10 flows downwardly through downflow chamber 36, around the lower edge 30a of baffle 30, that is, through flow passageway 34, and then upwardly through upflow chamber 38. From upflow chamber 38, the liquid stream flows around the upper edge 32b of baffle 32 to again flow in a downward direction through the next respective downflow chamber 36. The flow pattern is repeated as the liquid stream passes from inlet port 24 to outlet port 26. (See the unmarked, U-shaped arrows.) The baffles present a barrier to the microorganisms or bacteria in the reactor which impedes their flow through the reactor. The microorganisms therefore tend to rise and fall within the reactor but move horizontally only at a very slow rate. This maintains the microorganisms within the reactor as the liquid stream passes therethrough so that treatment detention times of one day or less are possible.

An alternate embodiment of bioconversion reactor 10, bioconversion reactor 10', is illustrated in FIG. 2. Bioconversion reactor 10' is similar to reactor 10, differing in the configuration of baffles 30' and the relative sizes of the upflow and downflow chambers. In reactor 10', downflow chambers 36' have a smaller cross-sectional dimension and hence volume than upflow chambers 38'. Most of the microorganisms in the reactor were found to collect in the upflow chambers. Therefore, to promote mixing of the organic materials and the microorganisms and thereby increase the efficiency of the reactor, the downflow chambers were narrowed and the upflow chambers widened. In addition, the lower edges 30a of baffles 30' were slanted in the direction of upflow chambers 38' and thus away from the direction of the flow through the reactor. This was done to route a greater volume of flow to the center of upflow chambers 36' to further enhance mixing of the microorganisms and organic materials. The number of sample ports in reactor 10' was also increased by adding a second row of ports 44 to facilitate sampling and wasting of solids should clogging occur.

Another embodiment of the present invention is shown in FIG. 3. Bioconversion reactor 10" is similar to reactors 10 and 10'. The relative positions of the upflow and downflow chambers and the inlet and outlet ports, however, have been changed. Particularly, baffles 30" and 32" have been repositioned within the reactor so that an upflow chamber 36" is located adjacent to inlet port 24', which has been moved to a position near the bottom wall of the reactor. Similarly, outlet port 26' has been lowered, and a downflow chamber 38" has been located adjacent to outlet port 26'. Another embodiment could have a downflow chamber adjacent to both the inlet port (see FIG. 1) and the outlet port (see FIG. 3). The baffles could also be positioned such that upflow chambers are located adjacent to the inlet and outlet ports. The embodiment of FIG. 2 could be modified in the same manner.

Bioconversion reactor 100 shown in FIGS. 4, 4A and 4B is yet another embodiment. Reactor 100 is cylindrical in shape with bottom wall 160 of its shell 120 forming the base of the reactor. The reactor has inlet and outlet ports 240 and 260, respectively. The direction of the stream flow is indicated by arrows "AA", "BB", and the unmarked arrows within predetermined volume 220, which is defined by the top, bottom and circumferential walls 140, 160 and 180, respectively, of shell 120. A gas port 280 and sample ports 420 are also provided.

A plurality of vertical baffles 300 and 320 are positioned within predetermined volume 220 of cylindrical shell 120 to extend radially from the central axis thereof. The baffles are rectangular in shape and are joined on one side thereof to the interior of circumferential wall 180. The baffles are vertical and thus parallel to the shell's central axis. Baffles 320 are joined at the lower edges 320a thereof to bottom wall 160 of the shell. The lower edges 300a of baffles 300 are spaced from bottom wall 160 to define flow passageways 340 therebetween.

Baffles 300 and 320 divide the interior of shell 120 into a plurality of downflow and upflow chambers 360 and 380, respectively, which are shaped like pie slices (see FIGS. 4A and 4B). The cross-sectional dimensions of the downflow and upflow chambers may be equal as shown in FIG. 1, or the upflow chamber may be of larger volume as in the embodiment of FIG. 2. Similarly, the lower edges 300a may be straight as shown in FIG. 4 or slanted in the direction of the upflow chamber as in FIG. 2.

The level of the stream in the reactor is represented by line "CC". The upper edges 300b of baffles 300 may extend beyond this level as shown. The flow through the reactor is along the flow path established by baffles 300 and 320. The baffles force the liquid to flow under and over them as it passes from the inlet to the outlet port. The liquid stream entering reactor 100 through inlet port 240 flows downwardly through downflow chamber 360, around the lower edge 300a of baffle 300, that is, through flow passageway 340, and then upwardly through upflow chamber 380. From upflow chamber 380, the liquid stream flows around the upper edge 320b of baffle 320 to again flow in a downward direction through the next downflow chamber. The flow pattern is repeated as the liquid stream flows around the cylindrical shell from the inlet port to the outlet port. A wall 390 blocks fluid communication between the chambers adjacent to the inlet and outlet ports so that the stream will exit through the outlet port. As in the previous embodiments, the baffles present a barrier to the microorganisms which impede their flow through the reactor. The arrangement of the baffles, and inlet and outlet ports may also be modified as discussed in connection with the embodiment of FIG. 3.

Still another embodiment of the present invention is shown in FIG. 5. This embodiment is similar to the reactor shown in FIG. 2. Reactor 10''' further includes media 400 such as stones or plastic shapes such as spheres, saddles, or other open porous forms having density greater than water are placed in the bottom portions of each chamber. This media may have an average outside dimension of 1 to 4 inches. The purpose is in part to achieve better distribution of liquid so that it flows more uniformly up through the upflow chambers 38''', thereby achieving better treatment and less short circuiting. In addition, the bateria within the chambers are less likely to flow out of the system, especially when handling dilute soluble waste-waters with organic content measured at the chemical oxygen demand of from 200 to 4000 mg/1. With wastewater this dilute, flow rates tend to be relatively fast such that bacteria have a greater tendency to be transported out of the system. The media prevents this from occurring. This modification combines some of the advantages of an anaerobic filter system without the disadvantage of the high costs and greater clogging potential that results when the entire reactor contains such media.

Yet another embodiment is illustrated in FIGS. 6 and 7. Reactor 420 of this embodiment includes means for recycling effluent to mix with the influent. This is desirable to reduce the potential for low-pH conditions in the first chambers, and for effecting a better distribution of bacterial species throughout the reactor, especially with more concentrated wastewaters.

The recycle system may include suitable conduit 422 for recycling effluent from the outlet port 426 to the inlet port 424 where it enters the reactor at the first downflow chamber 436. Pumps 423 and 425 are provided to control recycling and the introduction of influent.

The last upflow chamber 438 of reactor 420 incorporates suitable media 427, such as a plastic filling material, so that this chamber functions as a clarifying chamber to keep bacteria within the system. The effluent of the reactor is taken from the center of the last chamber by means of the piping illustrated.

A gas recycle line 440 is also included. The gas recycle enables suspended solids to be loosened in order to prevent clogging of the filling material.

Each chamber includes a system that permits solids collection and wasting. Piping 470 at the bottom of each chamber represents such a system. The associated valving and pumps for this system are not shown.

Each upflow chamber 438 also includes a false bottom 450 (see FIG. 7) having a series of orifices 452 through which the fluid from the downflow chamber enters the upflow chamber. The false bottom provides enhanced distribution of liquids as it enters the upflow chamber, thus providing more uniform upward flow of liquid. As shown, the lower edges 430a of baffles 430 are slanted in the direction of the upflow chambers. A portion of the lower edge of the alternate baffles is slanted toward the inlet port.

Overflow rims 454 may also be included on the upflow chambers. Such rims help keep the biomass within the upflow chambers by encouraging more uniform flow of liquid.

Further, as can be best seen in FIG. 6, the chambers of reactor 420 have a step-down configuration wherein the overflow level 456 in the first upflow chamber is the highest with the overflow level 458 in the last chamber being the lowest. The overflow levels between adjacent upflow chambers may differ in height from about 3 to 5 centimeters. As such, overflow level 456 may be about 3 to 5 centimeters higher than overflow level 457.

Although certain specific embodiments of the invention have been described herein in detail, the invention is not to be limited to only such embodiments, but rather only by the appended claims.

What is claimed is:

1. A bioconversion reactor for the anaerobic fermentation of organic material, comprising:
   a shell having top, bottom and side walls enclosing a predetermined volume;
   an inlet port in said shell through which a liquid stream containing the organic material enters said shell;
   an outlet port in said shell through which said liquid stream exits said shell;
   a plurality of baffles positioned within said shell along a length thereof and spaced from one another with sides thereof joined to said side walls of said shell, at least one of said baffles joined at a lower edge thereof to said bottom wall of said shell to extend substantially vertically upwardly therefrom, an upper portion of at least one of the other of said baffles substantially parallel to said baffle joined at the lower edge thereof to said bottom wall and a lower edge of the other of said baffles spaced from said bottom wall and slanted toward said outlet port to define a flow passageway; and
   said baffles being positioned and arranged to define an upflow chamber for the flow of said liquid stream therethrough in fluid communication with one side of said flow passageway and a downflow chamber for the flow of said liquid stream therethrough in fluid communication with an opposite side of said flow passageway, the volume of said downflow chamber being less than that of said upflow chamber.

2. The bioconversion reactor of claim 11 further including a gas port in said shell through which gases produced in said predetermined volume may escape.

3. The bioconversion reactor of claim 2 further including sample ports in said shell.

4. The bioconversion reactor of claim 3 wherein said shell is rectangular in shape.

5. The bioconversion reactor of claim 3 wherein said shell is cylindrical in shape.

6. The bioconversion reactor of claim 1 further including media located at the bottom of said shell between said baffles for achieving a more uniform flow of said liquid stream through said predetermined volume.

7. The bioconversion reactor of claim 6 wherein said media comprises particles having an average outside dimension of 1 to 4 inches.

8. The bioconversion reactor of claim 1 further including means for recycling said liquid stream exiting said shell with said liquid stream entering said shell.

9. The bioconversion reactor of claim 1 further including a gas recycle line means for recycling gas from said outlet port back into said shell.

10. The bioconversion reactor of claim 1 further including means for collecting and wasting solids in said shell.

11. A bioconversion reactor for the anaerobic fermentation of organic material contained in a liquid stream, comprising:
   a shell having top, bottom and side walls enclosing a predetermined volume;
   an inlet port in said shell through which said liquid stream enters said shell;
   an outlet port in said shell through which said liquid stream exits said shell;
   a plurality of baffles located within said shell along a length thereof in a substantially parallel relationship and spaced from one another with sides thereof joined to said side walls of said shell, alternate ones of said baffles having a portion of a lower edge thereof slanted toward said inlet port with the other said baffles having an upper portion thereof substantially parallel to an upper portion of said alternate ones of said baffles and a lower edge thereof spaced from said bottom wall to slant toward said outlet port to define a flow passageway for the flow of said liquid stream therethrough;
   said baffles being positioned and arranged to define an upflow chamber for the flow of said liquid stream therethrough in fluid communication with one side of each of said flow passageways and a downflow chamber for the flow of said liquid stream therethrough in fluid communication with one side of each of said flow passageways, the volume of said downflow chamber being less than that of said upflow chamber; and
   said plurality of baffles serving to maintain a microorganism within said shell as said liquid stream flows therethrough.

12. The bioconversion reactor of claim 11 further including a gas port through which gases produced by the anaerobic fermentation of organic material in said shell may pass.

13. The bioconversion reactor of claims 11 or 12 wherein the baffle closest to said inlet port has its lower edge thereof spaced from said bottom wall of said shell.

14. The bioconversion reactor of claim 13 wherein the baffle closest to said outlet port has its lower edge thereof spaced from said bottom wall of said shell.

15. The bioconversion reactor of claim 14 further including sample ports in said shell.

16. The bioconversion reactor of claim 11 or 12 wherein the baffle closest to said inlet port has its lower edge thereof joined to said bottom wall of said shell.

17. The bioconversion reactor of claim 16 wherein the baffle closest to said outlet port has its lower edge thereof joined to said bottom wall of said shell.

18. The bioconversion reactor of claim 11 wherein the upflow chamber nearest said outlet port has media therein so that said upflow chamber nearest said outlet port functions as a clarifying chamber.

19. The bioconversion reactor of claim 11 wherein said upflow chamber includes means for providing enhanced distribution of flow of said liquid stream flowing therein.

20. The bioconversion reactor of claim 19 wherein said enhanced distribution means includes a false bottom at the bottom of said upflow chamber, said false bottom having a series of orifices formed therein.

21. The bioconversion reactor of claim 19 wherein said enhanced distribution means includes a partition located at the bottom of said upflow chamber, said partition having a number of fluid passageways provided therein.

22. The bioconversion reactor of claim 11 or 21 wherein the top of said upflow chamber includes vertical and horizontal extensions thereof that form an overflow rim.

23. The bioconversion reactor of claim 11 wherein the baffles are positioned and arranged and that the overflow level in successive upflow chambers differ in height.

24. The bioconversion reactor of claim 11 wherein the baffles are positioned and arranged such that the overflow level of the upflow chamber nearest the inlet port is higher than the overflow levels of the other upflow chambers.

25. The bioconversion reactor of claim 11 wherein the baffles are positioned and arranged such that the overflow level of the upflow chambers decrease in height away from said inlet port.

26. The bioconversion reactor of claim 11 wherein the baffles are positioned and arranged such that the overflow levels of said upflow chambers have a step-down configuration.

27. The bioconversion reactor of claim 11 wherein the baffles are positioned and arranged such that the respective overflow levels of adjacent upflow chambers decrease in height with the highest overflow level located nearest to said inlet port.

28. The bioconversion reactor of claim 27 wherein the decrease in height is between about 3 to 5 centimeters between adjacent upflow chambers.

29. A bioconversion reactor for containing a microorganism for the anaerobic fermentation of organic materials contained in a liquid stream, comprising:

a shell having top, bottom and side walls enclosing a predetermined volume;

an inlet port in said shell through which said liquid stream enters said shell;

an outlet port in said shell through which said liquid stream exits said shell;

a plurality of baffles located within said shell along a length thereof and spaced from one another with sides thereof joined to said side walls of said shell, at least one of said baffles joined at the lower edge thereof to said bottom wall of said shell with at least one of the other of said baffles having a lower edge thereof spaced from said bottom wall to define a flow passageway therebetween;

and said baffles being positioned and arranged to define an upflow chamber for the flow of said liquid stream therethrough in fluid communication with said flow passageway on one side thereof, the top of said upflow chamber including vertical and horizontal extensions thereof that form an overflow rim and a downflow chamber for the flow of said liquid stream therethrough in fluid communication with said flow passageway on the side thereof opposite said one side; and wherein said liquid stream in said shell flows downwardly through said downflow chamber and then through said flow passageway to flow upwardly through said upflow chamber, said baffles impeding the flow of said microorganism through said shell so that said microorganism remains therein as said liquid stream flows therethrough.

30. The bioconversion reactor of claim 29 wherein the volume of said downflow chamber is less than that of said upflow chamber.

31. The bioconversion reactor of claim 30 wherein the lower edge of the other said baffles is slanted away from said downflow chamber adjacent thereto.

32. A bioconversion reactor for the anaerobic fermentation of organic material contained in a liquid stream, comprising:

a shell having top, bottom and side walls enclosing a predetermined volume;

an inlet port in said shell through which said liquid stream can enter said shell;

an outlet port in said shell through which said liquid stream can exit said shell;

a plurality of baffles located within said shell along a length thereof and spaced from one another with sides thereof joined to said side walls of said shell, at least one of said baffles joined at a lower edge thereof to said bottom wall of said shell with at least one of the other of said baffles having an upper portion thereof substantially parallel to the upper portion of said baffle joined at the lower edge thereof to said bottom wall and the lower edge thereof spaced from said bottom wall and slanted toward said outlet port to define a flow passageway therebetween;

said baffles being positioned and arranged to define a downflow chamber for the flow of said liquid stream therethrough in fluid communication with said flow passageway on that side thereof nearest said inlet port and an upflow chamber for the flow of said liquid stream therethrough in fluid communication with said flow passageway on that side thereof nearest said outlet port, the volume of said downflow chamber being less than that of said upflow chamber wherein the respective overflow levels of adjacent upflow chambers decrease in height with the highest overflow level located nearest said inlet port.

33. The bioconversion reactor of claim 32 further including a gas port in said shell through which gases produced in said shell may escape.

34. The bioconversion reactor of claim 33 wherein the baffle closest to said inlet port has its lower edge thereof spaced from said bottom wall.

35. The bioconversion reactor of claim 34 wherein the baffle closest to said outlet port has its lower edge thereof spaced from said bottom wall.

36. The bioconversion reactor of claim 35 further including sample ports in said shell.

37. The bioconversion reactor of claim 32 further including media located at the bottom of said shell between said baffles for achieving a more uniform flow of said liquid stream through said predetermined volume.

38. The bioconversion reactor of claim 37 wherein said media comprises discrete particles having an average outside dimension of 1 to 4 inches.

39. The bioconversion reactor of claim 32 further including means for recycling said liquid stream exiting said shell with said liquid stream entering said shell.

40. The bioconversion reactor of claim 32 wherein the upflow chamber adjacent said outlet port has media therein so that said upflow chamber functions as a clarifying chamber.

41. The bioconversion reactor of claim 32 further including a gas recycle line means for recycling gas from said outlet port back into said shell.

42. The bioconversion reactor of claim 32 further including means for collecting and wasting solids in said shell.

43. The bioconversion reactor of claim 33 wherein said upflow chamber includes means for providing enhanced distribution of flow of said liquid stream entering therein.

44. The bioconversion reactor of claim 43 wherein said enhanced distribution means includes a false bottom at the bottom of said upflow chamber, said false bottom having a series of orifices formed therein.

45. The bioconversion reactor of claim 43 wherein said enhanced distribution means includes a partition located at the bottom of said upflow chamber, said partition having a number of fluid passageways provided therein.

46. The bioconversion reactor of claim 32 or 45 wherein the top of said upflow chamber include vertical and horizontal extensions thereof that form an overflow rim.

47. A bioconversion reactor for the anaerobic fermentation of organic materials contained in a liquid stream by reaction with a microorganism, comprising:
a cylindrical shell having top and bottom walls and a circumferential wall enclosing a predetermined volume;
an inlet port in said shell through which said liquid stream enters said shell;
an outlet port in said shell through which said liquid stream exits said shell;
a plurality of baffles located within said shell and radiating from the central axis thereof to be spaced from one another with sides thereof joined to said circumferential wall of said shell, at least one of said baffles joined at a lower edge thereof to said bottom wall of said shell with at least one other of said baffles having a lower edge thereof spaced from said bottom wall and slanted in the direction of flow of said liquid stream to define a flow passageway therebetween for the flow of said liquid stream therethrough;
said baffles being positioned and arranged to define an upflow chamber for the flow of said liquid stream therethrough in fluid communication with said flow passageway on one side thereof and a downflow chamber for the flow of said liquid stream therethrough in fluid communication with said flow passageway on the side thereof opposite said one side, the volume of said downflow chamber being less than that of said upflow chamber; and
wherein said liquid stream in said shell flows downwardly through said downflow chamber and then through said flow passageway to flow upwardly through said upflow chamber, said baffles impeding the flow of said microorganism through said shell so that said microorganism remains therein as said liquid stream flows through said shell.

48. The bioconversion reactor of claim 47 further including a gas port in said shell through which gases produced by the anaerobic fermentation of organic material in said shell may pass.

49. The bioconversion reactor of claim 48 further including sample ports in said shells.

50. A bioconversion reactor for the anaerobic fermentation of organic materials contained in a liquid stream by reaction with a microorganism, comprising:
a cylindrical shell having top and bottom walls and a circumferential wall enclosing a predetermined volume;
an inlet port in said shell through which said liquid stream enters said shell;
an outlet port in said shell through which said liquid stream exits said shell;
means for recycling said liquid stream exiting said shell so it may be mixed with said liquid stream entering said shell;
a plurality of baffles substantially vertically positioned within said shell and radiating from a central axis thereof to be spaced from one another with sides thereof joined to said circumferential wall of said shell, at least one of said baffles joined at a lower edge thereof to said bottom wall of said shell to be substantially perpendicular therewith, at least one of the other of said baffles having a lower edge thereof spaced from said bottom wall and slanted in the direction of flow of said liquid stream through said shell to define a flow passageway therebetween;
said baffles being positioned and arranged to define an upflow chamber for the flow of said liquid stream therethrough in fluid communication with said flow passageway on one side thereof and a downflow chamber for the flow of said liquid stream therethrough in fluid communication with said flow passageway on the side thereof opposite said one side, the volume of said downflow chamber being less than that of said upflow chamber; and
wherein said liquid stream in said shell flows downwardly through said downflow chamber and then through said flow passageway to flow upwardly through said upflow chamber, said baffles impeding the flow of said microorganisms through said shell so that said microorganisms remain therein as said liquid stream flows through said shell.

* * * * *

UNITED STATES PATENT AND TRADEMARK OFFICE
CERTIFICATE OF CORRECTION

PATENT NO. : 5,091,315  Page 1 of 2
DATED : February 25, 1992
INVENTOR(S) : Perry L. McCarty, et al It is certified that error appears in the above-indentified patent and that said Letters Patent is hereby corrected as shown below:

In column 1, line 15, replace "1985" with --1982--;

In column 8, line 10, claim 2, replace "11" with --1--;

In column 9:

Line 40, claim 22, after "rim" insert --to assist in maintaining said microorganism within said upflow chamber--;

Line 41, claim 23, after "arranged" insert --in the said shell such--;

Line 46, claim 24, after "arranged" insert --in the said shell such--;

Line 51, claim 25, after "arranged" insert --in the said shell such--;

Line 55, claim 26, after "arranged" insert --in the said shell such--;

Line 59, claim 27, after "arranged" insert --in the said shell such--;

UNITED STATES PATENT AND TRADEMARK OFFICE
CERTIFICATE OF CORRECTION

PATENT NO. : 5,091,315
DATED : February 25, 1992
INVENTOR(S) : Perry L. McCarty, et al It is certified that error appears in the above-indentified patent and that said Letters Patent is hereby corrected as shown below:

In column 10, line 15, claim 29, delete the first occurrence of "and";

In column 11, line 34, claim 43, replace "33" with --32--.

Signed and Sealed this

Twenty-sixth Day of July, 1994

Attest:

BRUCE LEHMAN

Attesting Officer     Commissioner of Patents and Trademarks